US012581577B2

(12) United States Patent
Li et al.

(10) Patent No.: US 12,581,577 B2
(45) Date of Patent: Mar. 17, 2026

(54) METHOD AND APPARATUS FOR HIGH-EFFICIENCY SUPPLY INTEGRITY WITH FAST AND LARGE LOAD VARIATION

(71) Applicant: Avago Technologies International Sales Pte. Limited, Singapore (SG)

(72) Inventors: Shengyuan Li, Irvine, CA (US); I-Ning Ku, Irvine, CA (US); Xicheng Jiang, Irvine, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 295 days.

(21) Appl. No.: 18/122,063

(22) Filed: Mar. 15, 2023

(65) Prior Publication Data

US 2024/0314907 A1 Sep. 19, 2024

(51) Int. Cl.
H02M 3/158 (2006.01)
H02M 1/00 (2006.01)
H05B 45/38 (2020.01)

(52) U.S. Cl.
CPC .......... H05B 45/38 (2020.01); H02M 1/0025 (2021.05); H02M 3/158 (2013.01)

(58) Field of Classification Search
CPC ........ H05B 45/00; H05B 45/30; H05B 45/32; H05B 45/325; H05B 45/335; H05B 45/35; H05B 45/355; H05B 45/37; H05B 45/3725; H05B 45/375; H05B 45/38; H05B 45/382; H05B 45/385; H05B 45/395
See application file for complete search history.

(56) References Cited

U.S. PATENT DOCUMENTS

| | | | | |
|---|---|---|---|---|
| 9,161,407 B2 * | 10/2015 | Yu | .......................... | H05B 45/38 |
| 2009/0174347 A1 * | 7/2009 | Kumagai | .............. | H02M 3/156 |
| | | | | 315/294 |
| 2012/0249103 A1 * | 10/2012 | Latham | ................. | H02M 3/158 |
| | | | | 323/282 |
| 2013/0320954 A1 * | 12/2013 | Capofreddi | ......... | H02M 3/1582 |
| | | | | 323/311 |
| 2016/0370816 A1 * | 12/2016 | Wei | ........................... | G05F 1/56 |
| 2017/0155324 A1 * | 6/2017 | Choquet | ............. | H02M 3/1582 |
| 2018/0183338 A1 | 6/2018 | Fukushima et al. | | |
| 2020/0236761 A1 | 7/2020 | Shi et al. | | |
| 2023/0402919 A1 * | 12/2023 | Gajda | ................ | H02M 1/0045 |

OTHER PUBLICATIONS

Foreign Search Report on non-Foley case related to U.S. Appl. No. 18/122,063 Dtd Sep. 25, 2024.

* cited by examiner

*Primary Examiner* — Thienvu V Tran
*Assistant Examiner* — Jonathan Walter Soileau
(74) *Attorney, Agent, or Firm* — Foley & Lardner LLP

(57) ABSTRACT

An apparatus includes a boost converter including a compensation circuit to implement a switching scheme and partitioned into multiple circuits and a calculator circuit configured to determine a voltage to be applied to the compensation circuit. The multiple circuits each includes a capacitor and a voltage is applicable to pre-charge the capacitors to a voltage corresponding to an error voltage, as determined by the calculator circuit. The pre-charged capacitors can enable an immediate settling of the error voltage to achieve an instantaneous response of the compensation circuit. Beneficially, the apparatus can drive a power stage circuit to supply power to a load (e.g., LED) without overshoot or undershoot.

20 Claims, 7 Drawing Sheets

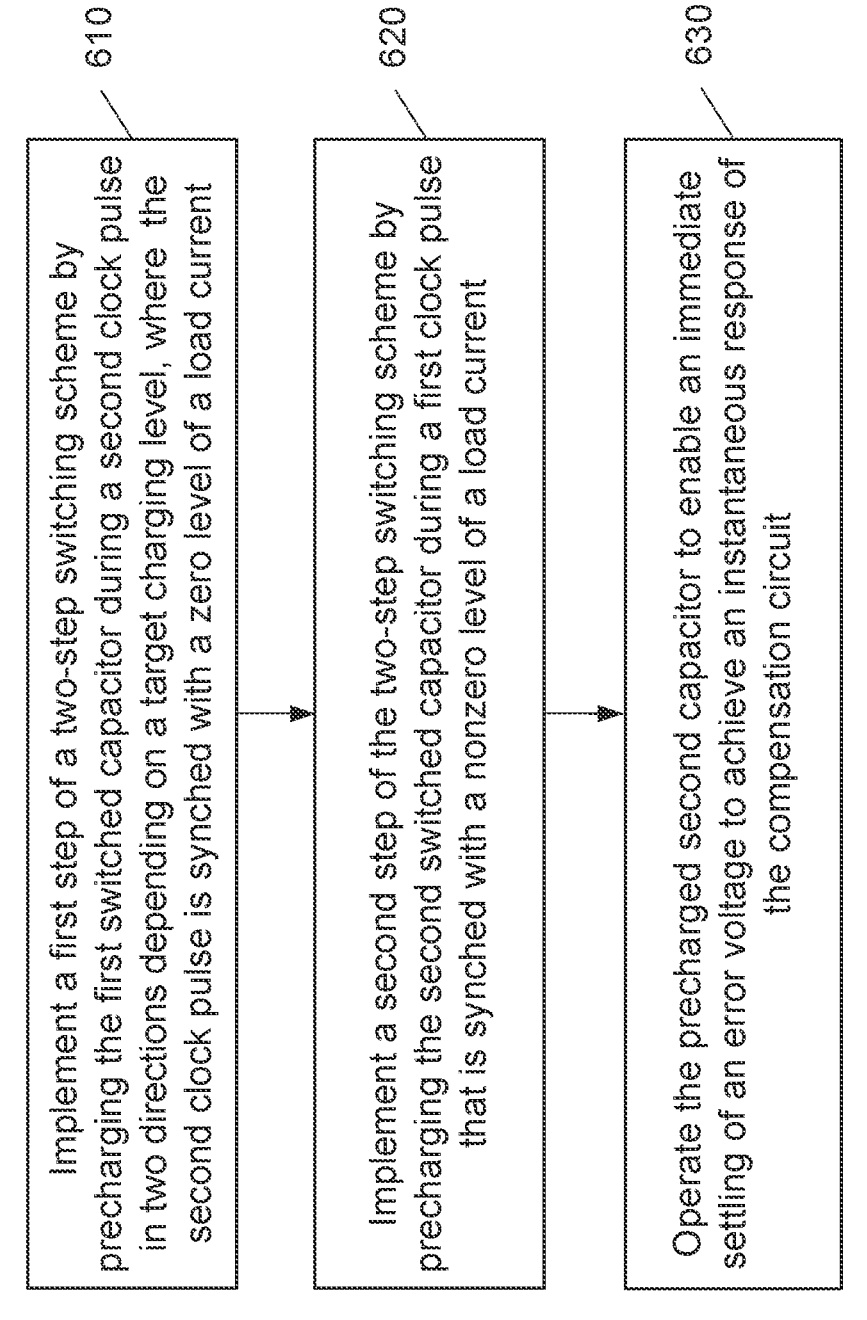

600

Implement a first step of a two-step switching scheme by precharging the first switched capacitor during a second clock pulse in two directions depending on a target charging level, where the second clock pulse is synched with a zero level of a load current — 610

Implement a second step of the two-step switching scheme by precharging the second switched capacitor during a first clock pulse that is synched with a nonzero level of a load current — 620

Operate the precharged second capacitor to enable an immediate settling of an error voltage to achieve an instantaneous response of the compensation circuit — 630

*FIG. 6*

METHOD AND APPARATUS FOR HIGH-EFFICIENCY SUPPLY INTEGRITY WITH FAST AND LARGE LOAD VARIATION

TECHNICAL FIELD

The present description relates generally to electronic circuits including, for example, a method and apparatus for high-efficiency supply integrity with fast and large load variation for electronic devices.

BACKGROUND

A switching-mode power supply (SMPS) switches on a power stage to charge an inductor during a duty cycle time set by a pulse width modulator. The stored energy in the inductor will then be transferred to output by switching off the power stage during the rest of this switching cycle. This kind of switching behavior makes SMPS's startup current a triangular shape rather than a direct current (DC) as in the linear regulators, which suggests that the SMPS's input current would have a high crest factor.

An SMPS can operate either in active mode or standby mode. The active mode is used for an operation where the SMPS supports the load while maintaining an output voltage regulation under all kinds of disturbances. In the active mode, the load-current level can be anywhere from 0 to full load. For wearable devices including smartwatches and other healthcare sensor devices using one or more light emitting diodes (LEDs), the LED current usually appears as a train of return-to-zero (RTZ) pulses where current steps up from zero to some programmed levels, and then steps back to zero. Such an RTZ load current presents a significant challenge to the load-transient performance of the SMPS. The reason is that, at no load, the SMPS usually stays in a deep pulse frequency modulation (PFM) mode where the loop bandwidth (BW) can be sub-KHz. Before the control loop can respond, the undershoot create serious headroom problem for the following blocks such as the linear regulator. This will limit the linear regulator's output settling speed and force the system to wait a longer time before valid samples can be taken and processed, therefore, wasting energy, lowering the bit-error rate (BER) and slowing down the signal processing.

An existing technique uses pulse width modulation (PWM) plus PFM to cover the full load range, maintain the efficiency and keep the error amplifier's output (Verr) relatively constant for a fast load-transient recovery. With a zero load, Verr still drops below the PFM threshold voltage (Vpfm) and boost converter operates in a deep PFM mode. In such a case, when the full load attacks, Verr will first experience a slew rate limit from the error amplifier and then the small signal BW limit, which is about one fifth of the full-signal width, in an aggressive design.

BRIEF DESCRIPTION OF THE DRAWINGS

Certain features of the subject technology are set forth in the appended claims. However, for purposes of explanation, several aspects of the subject technology are depicted in the following figures.

FIG. 6 is a flow diagram illustrating an example of a process for implementing a two-step switching scheme, according to aspects of the subject technology.

DETAILED DESCRIPTION

The detailed description set forth below is intended as a description of various configurations of the subject technology, and is not intended to represent the only configurations in which the subject technology may be practiced. The appended drawings are incorporated herein, and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block-diagram form in order to avoid obscuring the concepts of the subject technology.

According to some aspects, the subject technology is directed to a method and apparatus for high-efficiency power supply integrity with fast and large load variation and near-zero undershoot in the output voltage for electronic devices, for example, wearable devices with healthcare sensors. Such wearable devices may use LEDs for application such as photoplethysmography (PPG) application. In some embodiments, the power supply includes a boost converter. The boost converter of the subject technology includes a compensation circuit partitioned into a first circuit including a first capacitor and a second circuit. The terms "compensation," "compensate," or "compensating" refer to an offset of a value, including a partial or total offset. In this regard, the compensation circuit can provide a compensation voltage to offset an error voltage. The compensation circuit can implement a switching scheme to provide an output voltage with a near-zero undershoot, as explained herein. A calculator block determines a voltage to be applied to the second circuit including a second capacitor. The voltage is applicable to pre-charge the second capacitor. The pre-charged second capacitor can enable an immediate settling of an error voltage to achieve an instantaneous response.

In some embodiments, the disclosed compensation circuit includes a compensation capacitor, which is partitioned into two parallel circuits. The first circuit includes a fixed capacitor, and the second circuit is formed by a switched capacitor. In some embodiments, the calculator block is a digital calculator block, or a processor that uses boost operation conditions such as a load current level (e.g., electrical current), an input voltage, and output voltage of the boost converter as it inputs and calculates a voltage. In some embodiments, the voltage corresponds to the load current. In some embodiments, the voltage is a steady-state error amplifier output voltage used for the second capacitor to be pre-charged to during a zero-load current level phase. The LED load current level comes at a rising edge of a control signal, which is used to switch the switched capacitor of the compensation circuit.

Figure 1:
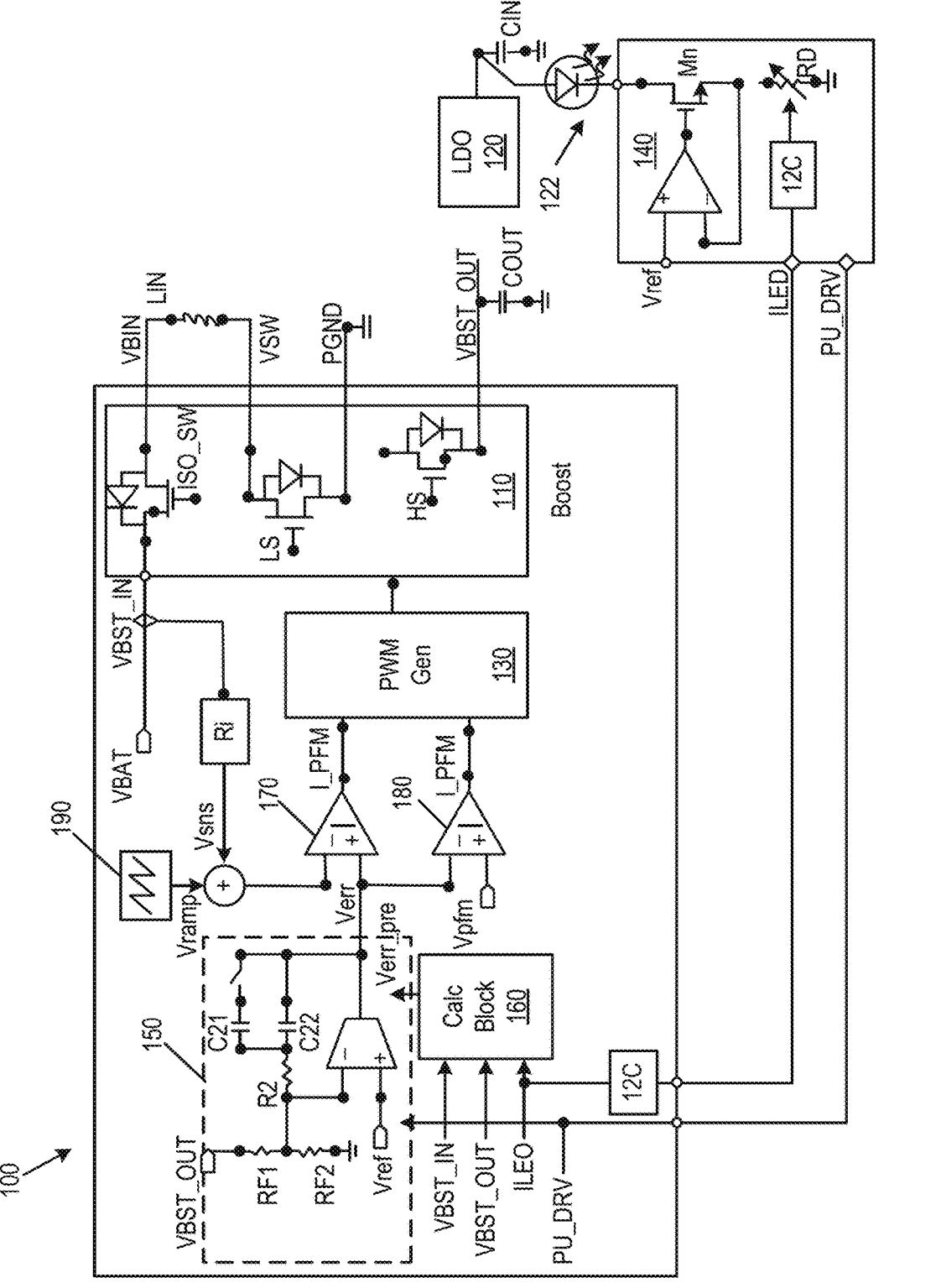
FIG. 1 is a schematic diagram illustrating an example of an apparatus for high-efficiency supply integrity with fast and large load variation, according to aspects of the subject technology.

FIG. 1 is a schematic diagram illustrating an example of an apparatus 100 for high-efficiency supply integrity with fast and large load variation, according to aspects of the subject technology. In some embodiments, the apparatus 100 is a SMPS including a boost converter for providing a load current with a near-zero overshoot to a load such as an LED 122. In some aspects, an overshoot is a transient voltage or current with an amplitude that exceeds a nominal value of the current or voltage. In some embodiments, the overshoot can be about 200 mV for the full output voltage range (e.g., 4.7 V to 5.6 V). In some embodiments, the apparatus 100 is a regulator circuit. In some embodiments, the apparatus 100 is an integrated circuit. In some embodiments, the apparatus 100 includes, but is not limited to, a power stage circuit 110, a low-dropout (LDO) stage 120, a PWM generator circuit 130, a driver circuit 140, a compensation circuit 150, a calculator circuit 160, a PWM comparator 170 and a PFM comparator 180.

In some embodiments, the apparatus 100 is a boost converter designed to output a voltage that is greater than an input voltage. The boost converter may enhance the value of the input voltage by using a switching circuit. As parts of the switching circuit, the power stage circuit 110 includes an isolation switch ISO_SW, a low-side (LS) switch, and a high-side (HS) switch. A boost inductor LIN is connected between terminals VBIN and VSW of the power stage circuit 110. The PWM generator circuit 130 provides a duty cycle in the form of PWM pulses to the LS and HS switches to enable switching mode operation of the apparatus 100. The LDO stage 120 regulates the output voltage. The duty cycle of a pulse is determined by dividing a width of the pulse by the period (inverse of the frequency) of the pulse. For example, a pulse with a frequency of 1 kHz and a pulse width of 0.5 millisecond (mS) would have a duty cycle of 50%(0.5 mS/1 mS). The power stage circuit 110 power to the LED 122 by using the driver circuit 140, which adjusts the load current provided by the power stage circuit 110 to the LED 122 at a desired LED current (ILED) level (e.g., within a range of about 300 milliamps (mA) to 400 mA).

In some embodiments, the calculator circuit 160 is a digital circuit and determines the voltage based on operation conditions of the boost converter. In some embodiments, the calculator circuit 160 is a processor. In some embodiments, calculator circuit calculates the error voltage based at least one of i) an input voltage (VBST_OUT) to the power stage circuit, ii) an output voltage (VBST_OUT) from the power stage circuit, or iii) an electrical current (ILED) to the LED 122. In some embodiments, the operation conditions include the desired level of the load current (ILED), an input voltage VBST_IN and an output voltage VBST_OUT of the power stage circuit 110. In some embodiments, the voltage is a pre-calculated error voltage (Verr) associated with an error amplifier output (Verr_pre) corresponding to the load current. The two-step switching scheme of the subject technology relates to a two-level return-to-zero (RZ) load current pulse, which translates into two levels of Verr at steady state. The PWM comparator 170 compares Verr with an output of a summation block that sums a sense voltage (Vsns) to an output voltage (Vramp) of the ramp generator 190 to generate a PWM signal (i_PWM) that enables the PWM generator circuit 130. The PFM comparator 180 compares the Verr with a PFM signal (Vpfm) to generate a PFM signal (i_PFM) that enables PFM of the pulses generated by the PWM generator circuit 130. In some embodiments, the PWM signal and the PFM signal control the pulse width and switching frequency of the pulses provided to the switching circuit of the power stage circuit 110 that results in adjusting the load current provided to the LED 122. In other words, it can be said that the Verr indirectly controls the load current provided to the LED 122.

In some embodiments, the capacitor C21 of the compensation circuit 150 is pre-charged to a voltage during a zero current level phase of the ILED with Verr_pre so that C21 contains a predetermined voltage (e.g., the Verr) for the desired ILED level. When ILED from the driver circuit 140 arrives on the rising edge (e.g., transition of a signal change from 0 to 1) of the control signal PU_DRV, the pre-charged capacitor C21 switches and discharges, and Verr immediately (e.g., within a few ns) settles to achieve an instantaneous response. In some embodiments, the precharged capacitor C21 can act as a battery, once switched in the compensation circuit 150 and connected in parallel with the capacitor C22. The error voltage (Verr) is determined by the voltage stored in C21 as C21 is much larger than C22. Because the charge sharing process happens quickly, the error voltage is settled down instantly. Beneficially, a duty cycle of the PWM generator circuit 130 is corrected based on the settling of the error voltage Verr.

Figures 2A, 2B:
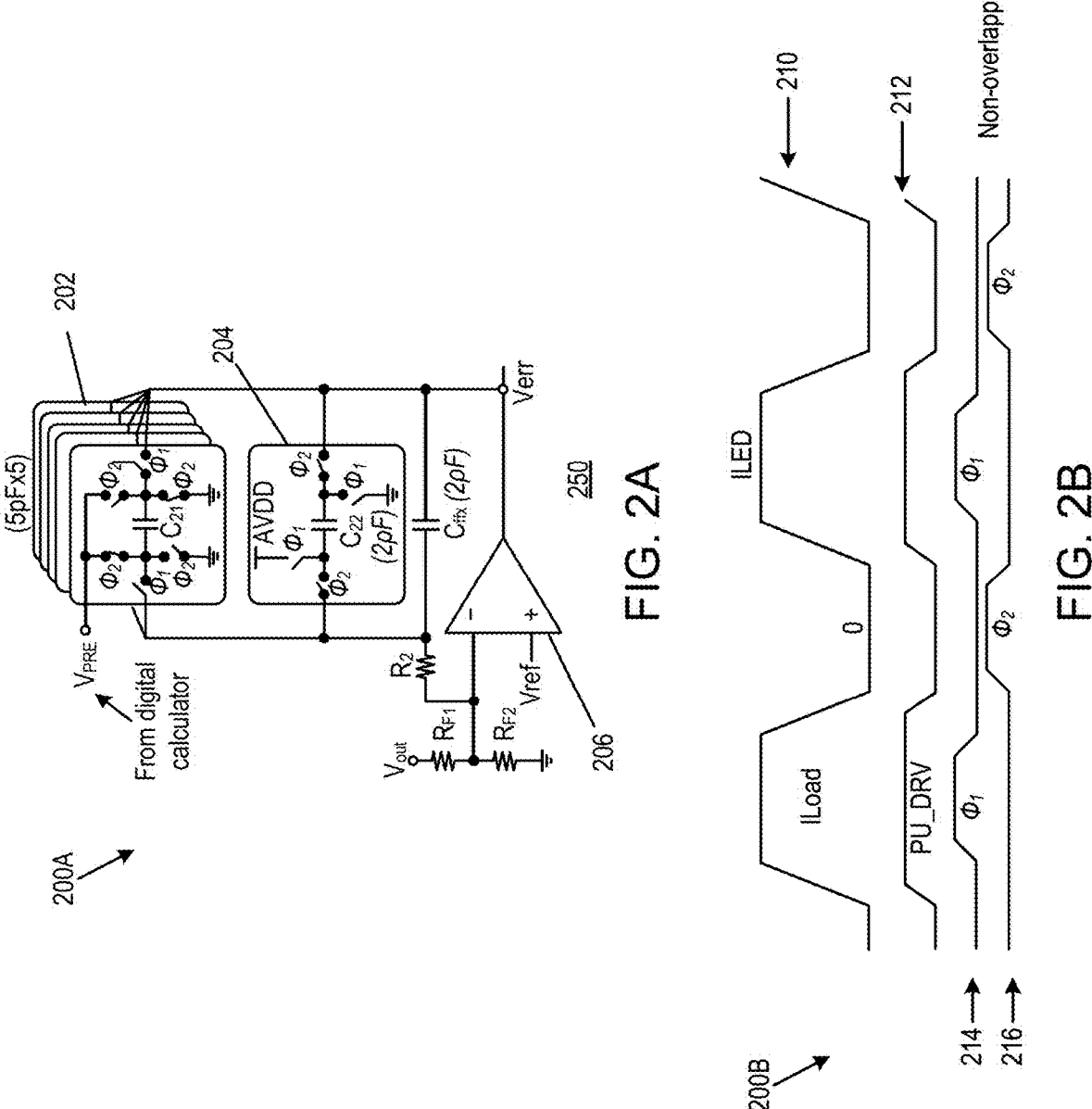
FIGS. 2A and 2B are a schematic diagram and a chart illustrating an example of a compensation circuit with a switching scheme, and a corresponding chart, according to aspects of the subject technology.

FIGS. 2A and 2B are a schematic diagram 200A and a chart 200B illustrating an example of a compensation circuit 250 with two-step switching scheme and a corresponding chart, according to aspects of the subject technology. The compensation circuit 250 illustrates partitioning of the capacitor C21 of the compensation circuit 150 of FIG. 1. The compensation circuit 250 includes a fix capacitor $C_{fix}$ in parallel with a first switched capacitor circuit 202 and a second switched capacitor circuit 204, which are partitions of the capacitor C21 of the compensation circuit 150 of FIG. 1.

In some embodiments, each of the first switched capacitor circuit 202 and the second switched capacitor circuit 204 is a programmable capacitor, and can be programmed by a clock pulse (φ1) and a clock pulse (φ2), respectively. In some embodiments, the clock pulse (φ1) and the clock pulse (φ2) are two-phase, non-overlapping clock pulses that are generated based on the control signal PU_DRV of FIG. 1, and therefore, are synchronized with different phases of the load current (ILoad) of the power stage circuit 110 of FIG. 1, which is also synched with the control signal PU_DRV (see FIG. 2B). In some embodiments, in a first step of the two-step switching scheme, the capacitor C21 of the first switched capacitor circuit 202 is pre-charged during the clock pulse (φ2) and the capacitor C22 of the second switched capacitor 204 is discharged during the clock pulse (φ2). During the first step, the switches at the clock pulse (φ2) are closed, and the switches at the clock pulse (φ1) are open. In some embodiments, the two directions of charging can store charges with opposite polarity on the capacitor C21. The pre-charging may occur in two directions depending on a target charging level (defined by Verr). Put another way, the voltage (e.g., predetermine voltage) applied to the capacitor C21 may include a positive voltage or a negative voltage, using additional switches at the clock pulse (φ2). In some embodiments, at the beginning of the clock pulse (φ1), the capacitor C21 is connected to the feedback network, and the compensator output settles to Verr without charging the capacitor C21 through the amplifier 206. In some embodiments, the feedback network includes resistors $R_{F1}$, $R_{F2}$ and $R_2$, which sample the output voltage ($V_{out}$). In some embodiments, at a beginning part (e.g., rising edge) of the clock pulse (φ1), the capacitor C21 is coupled to the feedback network through switches that are indicated as φ1 switch in FIG. 2A as they respond to the clock pulse (φ1). In some embodiments, in a second step of the two-step switching scheme, the capacitor C22 of the second switched capacitor circuit 204 is pre-charged during the clock pulse (φ1) and the capacitor C21 of the first switched capacitor 202 is discharged during the clock pulse (φ1). During the second step, the switches at the clock pulse (φ2) are open, and the switches at the clock pulse (φ1) are closed. In some embodiments, at the beginning of the clock pulse (φ2), the capacitor C22 is connected in parallel with the fixed capacitor ($C_{fix}$) via switches that are indicated as φ2 switch in FIG. 2A as the switches respond to the clock pulse (φ2) by closing, and the compensator output (Verr) is pulled down instantly to disable power stage and prevent the overshoot. In some embodiments, the second switched capacitor circuit 204 that includes C22 is programmable to be connected in parallel with the fixed capacitor.

The chart 200B includes plots 210, 212, 214 and 216. The plot 210 depicts switching of the load current (ILoad) between a zero value and ILED. The plot 212 shows that the control signal PU_DRV is in synch with the load current (ILoad). In some embodiments, two signals are being synchronized or in synch with one another if they make transitions (e.g., from low to high or vice versa) at the same time. The plots 214 and 216 illustrate a clock pulse (φ1) and a clock pulse (φ2), respectively. As seen from these plots, the clock pulse (φ1) is synched with a nonzero level (ILED) of the load current (ILoad), and the clock pulse (φ2) is synched with a zero level of the load current (ILoad).

Figure 3:
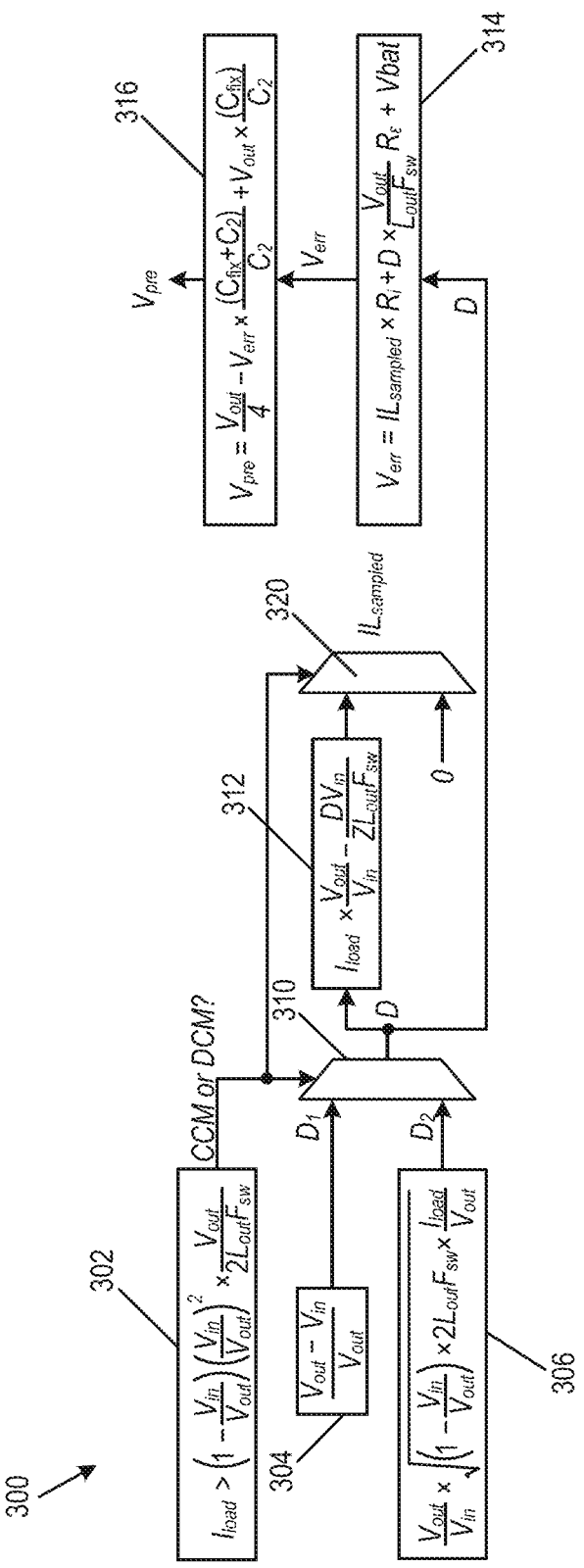
FIG. 3 is a diagram illustrating an example implementation of a calculator block of the apparatus of FIG. 1, according to aspects of the subject technology.

FIG. 3 is a diagram illustrating an example implementation of a calculator block 300 of the apparatus 100 of FIG. 1, according to aspects of the subject technology. In some embodiments, the calculator block 300 is a digital circuit. In some embodiments, the calculator block 300 is a processor. The calculator block 300 takes as inputs the boost operation conditions including the level of the load current ($I_{load}$), an input voltage ($V_{in}$), and an output voltage ($V_{out}$) of the power stage circuit 110 of FIG. 1 to calculate the steady-state error amplifier output voltage ($V_{pre}$).

In some embodiments, the calculator block 300 includes multiplexers (MUXes) 310 and 320, and calculation blocks 302, 304, 306, 312, 314 and 316, the mathematical functionalities of which are shown in FIG. 3 and are not reproduced here. The MUX 310 takes as input data D1 or data D2, which are, respectively, results of calculation blocks 304 and 306, based on a result of the calculation block 302, which is the selection signal for the MUX 310. The result of the calculation block 302 defines whether a continuous-conduction mode (CCM) or discontinuous-conduction mode (DCM) of operation is to be selected. The output D of the MUX 310 is fed into calculation blocks 312 and 314. The MUX 320 takes an output of the calculation block 312 or a zero (0) value as input data, based on the result of the calculation block 302, which defines whether a CCM or DCM mode of operation to be selected. The output of the MUX 320 is a sampled value of load current ($IL_{sampled}$) and is sent an input to the calculation block 314, which generates the error voltage ($V_{err}$) as its output. The error voltage is then sent to calculation block 316 to calculate the steady-state error amplifier output voltage ($V_{pre}$) that is applied to the first switched capacitor circuit 202 of FIG. 2.

Figure 4:
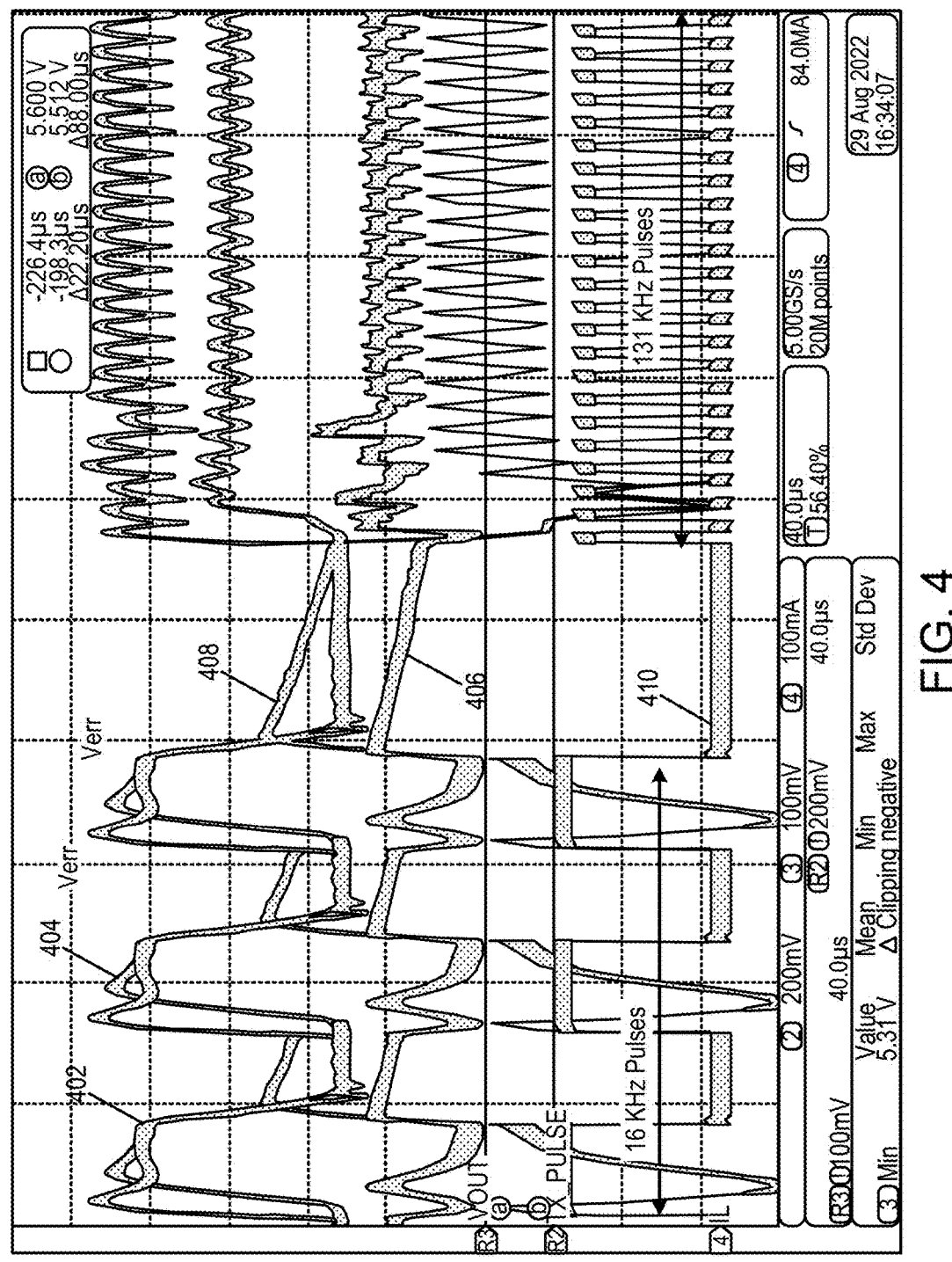
FIG. 4 is a chart illustrating example plots of silicon measurement results associated with the apparatus of FIG. 1, according to aspects of the subject technology.

FIG. 4 is a chart 400 illustrating example plots 402, 404, 406, 408 and 410 of silicon measurement results associated with the apparatus 100 of FIG. 1, according to aspects of the subject technology. The plots 402 and 406 show time variation of the $V_{err}$ and output voltage ($V_{out}$), respectively, obtained with the two-step switching scheme of the subject technology. The plots 404 and 408 depict time variation of the Verr and $V_{out}$, respectively, obtained without the two-step switching scheme of the subject technology. The plot 410 shows the time variation of the load current ($I_{load}$), which is seen to toggle between zero and 200 mA and zero again. Note the undershoot in the $V_{out}$ with the two-step switching is nearly zero, while for the case without the two-step switching is about 400 mV. This is an advantageous feature of the disclosed technique that can reduce the undershoot drastically from 400 mV to near zero. As mentioned above, the subject technology also allows fast and large load variation, which is seen from the plot 410 of the load current at 16 kHz and 131 KHz.

Figures 5A, 5B:
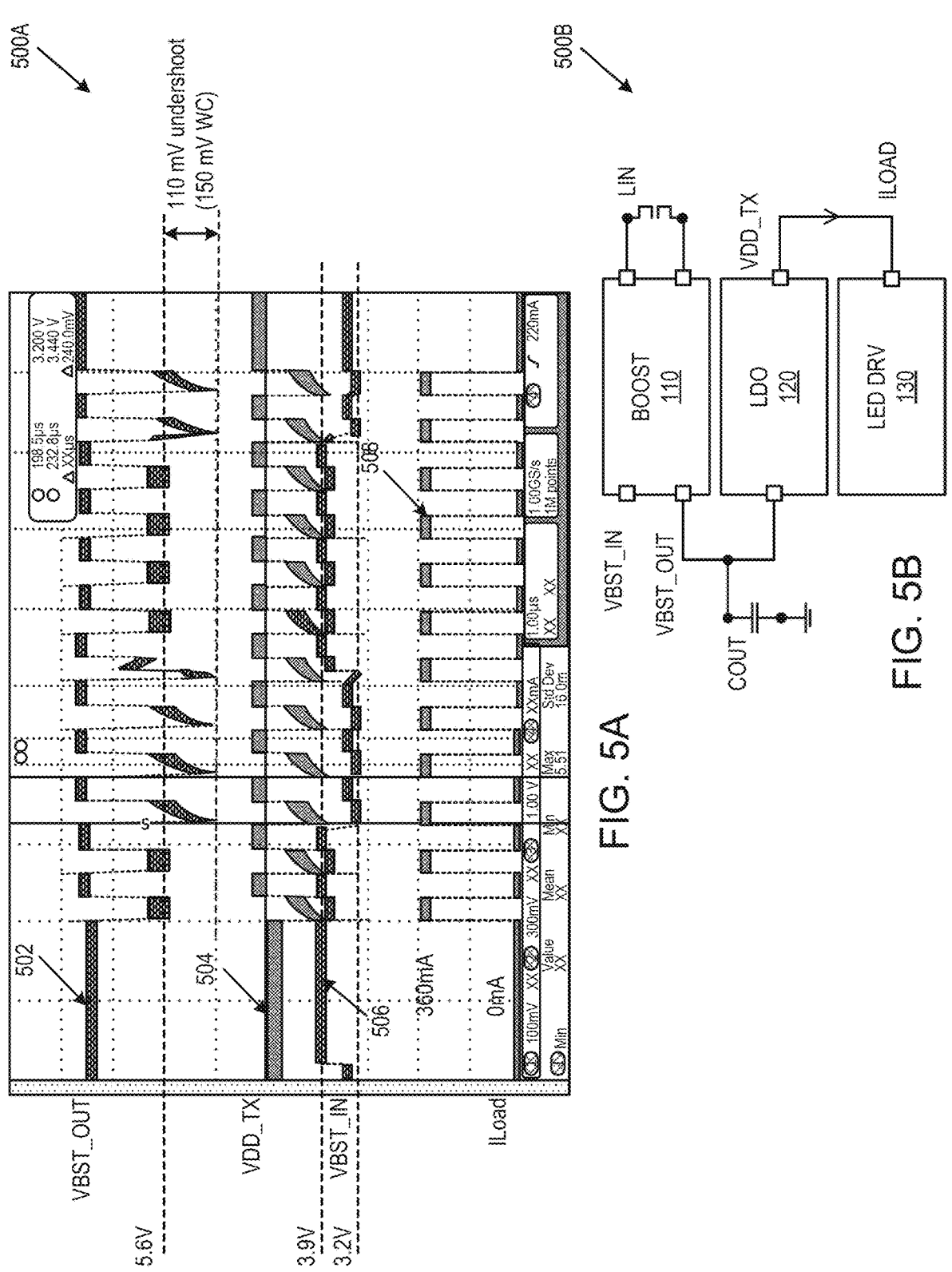
FIGS. 5A and 5B are a chart and a block diagram illustrating example plots of variables of the apparatus of FIG. 1, and a corresponding high-level diagram, according to aspects of the subject technology.

FIGS. 5A and 5B are a chart 500A and a high-level block diagram 500B illustrating example plots of variables of the apparatus 100 of FIG. 1 and a corresponding high-level diagram, according to aspects of the subject technology. The chart 500A includes plots 502, 504 506 and 508. The plot 502 shows time variation of the output voltage (VBST_OUT) of the power stage circuit 110 of FIG. 1. The plot 504 depicts time variation of the output voltage (VDD_TX) of the LDO stage 120 of FIG. 1. The plot 506 illustrates time variation of the input voltage (VBST_IN) of the power stage circuit 110 of FIG. 1, and the plot 508 shows time variation of the load current (ILoad) of the LDO stage 120 of FIG. 1. The measured results show the transient performance with both return-to-zero load and the input voltage dip. In some embodiments, the overshoot is less than about 200 mV and the undershoot is less than 150 mV.

The high-level block diagram 500B shows selected blocks of the apparatus 100 of FIG. 1, such as the power stage circuit 110, the LDO stage 120, the driver circuit 140, and the variables, the time variations of which are shown and discussed above.

FIG. 6 is a flow diagram illustrating an example of a process 600 for implementing a two-step switching scheme, according to aspects of the subject technology. The process 600 includes implementing the first step of the two-step switching scheme (e.g., see description of FIG. 2A) by pre-charging the first switched capacitor (e.g., C21 of FIG. 2A) during the second clock pulse (e.g., φ2 of FIG. 2B) in two directions depending on a target charging level, where the second clock pulse is synched with a zero level (e.g., ILED) of a load current (e.g., 210 of FIG. 2B) (block 610). The process 600 also includes implementing a second step of the two-step switching scheme by pre-charging the second switched capacitor (e.g., C22 of FIG. 2A) during the first clock pulse (e.g., φ1 of FIG. 2B), which is synched with a non-zero level (e.g., ILED) of the load current (block 620). The precharged second capacitor is operable to enable an immediate settling of an error voltage (e.g., error voltage Verr of FIG. 2A) to achieve an instantaneous response of the compensation circuit (block 630).

Figure 7:
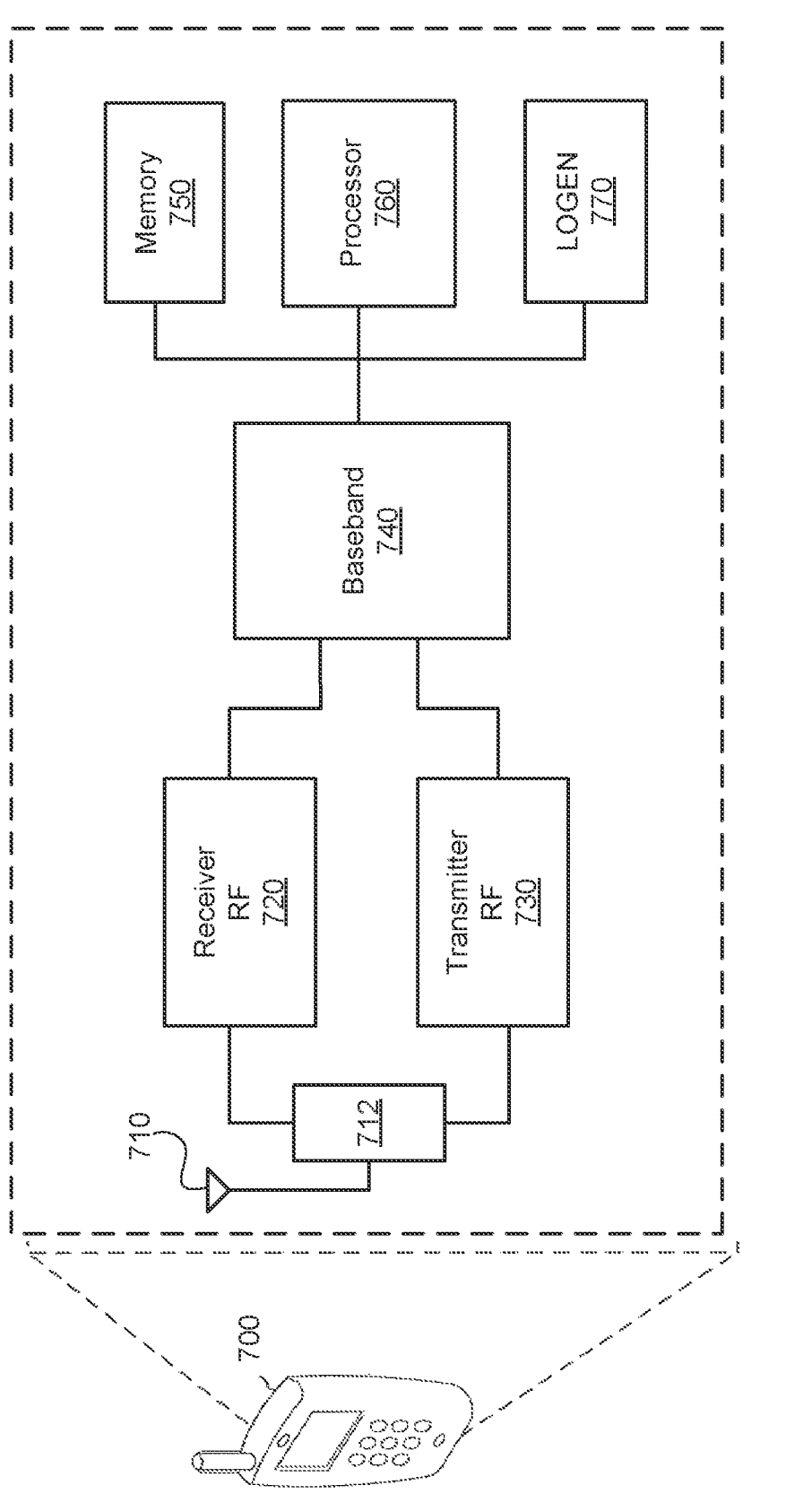
FIG. 7 illustrates an example of a wireless communication device within which some aspects of the subject technology are implemented

FIG. 7 illustrates an example of a wireless communication device within which some aspects of the subject technology are implemented. In one or more implementations, the wireless communication device 700 can be a smartphone, a smartwatch, or other electronic apparatus, including one or more health-sense device(s). The wireless communication device 700 may comprise an RF antenna 710, a duplexer 712, a receiver 720, a transmitter 730, a baseband processing module 740, a memory 750, a processor 760, and a local oscillator generator (LOGEN) 770. In various aspects of the subject technology, one or more of the blocks represented in FIG. 7 may be integrated on one or more semiconductor substrates. For example, blocks 720-770 may be realized in a single chip, a single system on a chip, or in a multichip chipset.

The receiver 720 may comprise suitable logic circuitry and/or code that may be operable to receive and process signals from the RF antenna 710. The receiver 720 may, for example, be operable to amplify and/or down convert received wireless signals. In various aspects of the subject technology, the receiver 720 may be operable to cancel noise in received signals, and may be linear over a wide range of frequencies. In this manner, the receiver 720 may be suitable for receiving signals in accordance with a variety of wireless standards such as Wi-Fi, WiMAX, BT, and various cellular standards. In various aspects of the subject technology, the receiver 720 may not use any sawtooth acoustic wave filters, and few or no off-chip discrete components such as large capacitors and inductors.

The transmitter 730 may include suitable logic circuitry and/or code that may be operable to process and transmit signals from the RF antenna 710. The transmitter 730 may, for example, be operable to up convert baseband signals to RF signals, and amplify RF signals. In various aspects of the subject technology, the transmitter 730 may be operable to up convert and amplify baseband signals processed in accordance with a variety of wireless standards. Examples of such standards may include Wi-Fi, WiMAX, BT, and various cellular standards. In various aspects of the subject technology, the transmitter 730 may be operable to provide signals for further amplification by one or more power amplifiers.

The duplexer 712 may provide isolation in the transmit band to avoid saturation of the receiver 720 or damaging parts of the receiver 720, and to relax one or more design requirements of the receiver 720. Furthermore, the duplexer 712 may attenuate the noise in the receive band. The duplexer 712 may be operable in multiple frequency bands of various wireless standards.

The baseband processing module 740 may comprise suitable logic, circuitry, interfaces, and/or code that may be operable to perform the processing of baseband signals. The baseband processing module 740 may, for example, analyze received signals, and generate control, and/or feedback signals for configuring various components of the wireless communication device 700, such as the receiver 720. The baseband processing module 740 may be operable to encode, decode, transcode, modulate, demodulate, encrypt, decrypt, scramble, descramble, and/or otherwise process data in accordance with one or more wireless standards.

The processor 760 may comprise suitable logic, circuitry, and/or code that may enable processing data and/or controlling operations of the wireless communication device 700. In this regard, the processor 760 may be enabled to provide control signals to various other portions of the wireless communication device 700. The processor 760 may also control the transfer of data between various portions of the wireless communication device 700. Additionally, the processor 760 may enable implementation of an OS, or otherwise execute code to manage operations of the wireless communication device 700. In one or more implementations, the processor 760 may be interfaced with transducer modules via existing host interface technologies such as an inter-integrated circuit (I2C), a serial interface protocol (SPI), a peripheral component interconnect express (PCIE), a universal asynchronous receiver-transmitter (UART), and/or other interface technologies, depending on the data rate needed to sample and pipe from the transducers module to the processor 760.

The memory 750 may comprise suitable logic, circuitry, and/or code that may enable storage of various types of information such as received data, generated data, code, and/or configuration information. The memory 750 may comprise, for example, RAM, ROM, flash, and/or magnetic storage. In various aspects of the subject technology, information stored in the memory 750 may be utilized for configuring the receiver 720 and/or the baseband processing module 740.

The LOGEN 770 may comprise suitable logic, circuitry, interfaces, and/or code that may be operable to generate one or more oscillating signals of one or more frequencies. The LOGEN 770 may be operable to generate digital and/or analog signals. In this manner, the LOGEN 770 may be operable to generate one or more clock signals, and/or sinusoidal signals. Characteristics of the oscillating signals such as the frequency and duty cycle, may be determined based on one or more control signals from, for example, the processor 760 and/or the baseband processing module 740.

In operation, the processor 760 may configure the various components of the wireless communication device 700 based on a wireless standard according to which it is designed to receive signals. Wireless signals may be received via the RF antenna 710, amplified, and down converted by the receiver 720. The baseband processing module 740 may perform noise estimation and/or noise cancellation, decoding, and/or demodulation of the baseband signals. In this manner, information in the received signal may be recovered and utilized appropriately. For example, the information may be audio and/or video to be presented to a user of the wireless communication device 700, data to be stored to the memory 750, and/or information affecting, and/or enabling operation of the wireless communication device 700. The baseband processing module 740 may modulate, encode, and perform other processing on audio, video, and/or control signals to be transmitted by the transmitter 730 in accordance with various wireless standards.

In some implementations, all active components of the wireless communication device 700, for example, the receiver 720, the transmitter 730, the baseband processing module 740, the memory 750, the processor 760, the LOGEN 770, and the transducers module 780 may receive power from a power supply including an SMPS including the apparatus 100 of FIG. 1 of the subject technology, and benefit from the high-efficiency supply integrity with fast, large variation, and near-zero undershoot output voltage.

The predicate words "configured to", "operable to", and "programmed to" do not imply any particular tangible or intangible modification of a subject, but, rather, are intended to be used interchangeably. For example, a processor configured to monitor and control an operation, or a component may also mean the processor is being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology, or that such aspect applies to all configurations of the subject technology. A disclosure relating to an aspect may apply to all configurations, or one or more configurations. A phrase such as an "aspect" may refer to one or more aspects, and vice versa.

A phrase such as a "configuration" does not imply that such configuration is essential to the subject technology, or that such configuration applies to all configurations of the subject technology. A disclosure relating to a configuration may apply to all configurations, or one or more configurations. A phrase such as a "configuration" may refer to one or more configurations, and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known, or later come to be known to those of ordinary skill in the art are expressly incorporated herein by reference, and are intended to be encompassed by the claims. Moreover, nothing disclosed herein is intended to be dedicated to the public, regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise", as "comprise" is interpreted when employed as a transitional word in a claim.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

What is claimed is:

1. An apparatus, comprising:
a first circuit;
a first comparator;
a second circuit configured to generate pulses with a duty cycle, wherein the pulses enable the first circuit to provide power to a load;
a second comparator configured to adjust a frequency of the pulses;
a first programmable capacitor configured to provide a voltage and to be charged in two directions depending on a target charging level based at least on the voltage, wherein the duty cycle of the pulses is configured based on the voltage; and
a second programmable capacitor configured to be charged based at least on the voltage at the first comparator.

2. The apparatus of claim 1, wherein:
the first programmable capacitor is configured to provide the voltage to the first comparator, and
the second programmable capacitor is configured to provide the voltage to the second comparator.

3. The apparatus of claim 2, wherein the first comparator is configured to provide a first current to the second circuit to control the duty cycle of the pulses.

4. The apparatus of claim 3, wherein the second comparator is configured to provide a second current to the second circuit to control the frequency of the pulses.

5. The apparatus of claim 3, wherein:
the first programmable capacitor is configured discharge in response to the first circuit providing power to the load, and
the second programmable capacitor charge in response to the first circuit providing power to the load.

6. The apparatus of claim 1, wherein the first programmable capacitor is configured to provide the voltage as a positive voltage or a negative voltage.

7. The apparatus of claim 1, wherein the load comprises a light emitting diode.

8. An apparatus, comprising:
a power stage circuit coupled to a load;
a first programmable capacitor configured to be charged in two directions depending on a target charging level;
a second programmable capacitor, wherein each of the first programmable capacitor and the second programmable capacitor is configured to:
obtain a voltage,
charge, based on the voltage, to a value prior to the power stage circuit providing power to the load, and
discharge the voltage while the power stage circuit is providing the power to the load; and
a comparator configured to adjust a frequency of discharge.

9. The apparatus of claim 8, further comprising:
a first set of switches; and
a second set of switches, wherein:
the first programmable capacitor is coupled to the first set of switches and the second set of switches and is charged with the voltage in response to i) the first set of switches being closed and ii) the second set of switches being open, and
the first programmable capacitor discharges the voltage in response to i) the first set of switches being open and ii) the second set of switches being closed.

10. The apparatus of claim 9, further comprising:
a third set of switches, wherein:
the voltage comprises a positive voltage in response to i) the first set of switches being closed and ii) the third set of switches being open, and
the voltage comprises a negative voltage in response to i) the first set of switches being open and ii) the third set of switches being closed.

11. The apparatus of claim 8, wherein the voltage is configured to compensate an error voltage and correct a duty cycle of pulses provided to the power stage circuit and used to enable controlling an output voltage of the power stage circuit.

12. The apparatus of claim 8, wherein the voltage is based on an input voltage of the power stage circuit.

13. The apparatus of claim 8, wherein the voltage is based on an output voltage of the power stage circuit.

14. An apparatus, comprising:
a first circuit; and
a second circuit configured to generate pulses with a duty cycle based on an input from a first comparator coupled to the first circuit,
wherein:
the first circuit is configured to provide power in response to receiving the duty cycle, wherein the duty cycle is adjusted based on a settling of an error voltage at an input of the first comparator, and the error voltage is configured to control the power;

a first capacitor configured to be pre-charged in two directions depending on a target charging level based at least on the error voltage;

a second comparator configured to adjust a frequency of the pulses; and a second capacitor configured to be charged based at least on the error voltage at the first comparator.

15. The apparatus of claim 14, comprising a light-emitting-diode (LED) and wherein the first circuit is further configured to provide power to the LED in response to receiving the duty cycle.

16. The apparatus of claim 14, wherein the first capacitor is coupled to the first comparator, and wherein in response to the first circuit powering the LED, the first capacitor is configured to provide a compensation voltage to compensate the error voltage.

17. The apparatus of claim 16, wherein each of the first capacitor and the second capacitor comprises a programmable capacitor.

18. The apparatus of claim 16, further comprising a calculator circuit configured to calculate the error voltage.

19. The apparatus of claim 18, wherein the calculator circuit calculates the error voltage based at least one of i) an input voltage to the first circuit, ii) an output voltage from the first circuit, or iii) an electrical current to the LED.

20. The apparatus of claim 18, wherein each of the first capacitor and the second capacitor comprises a programmable capacitor.

* * * * *